Jan. 13, 1931.  E. F. HOFER  1,788,717
SLED
Filed Dec. 10, 1927
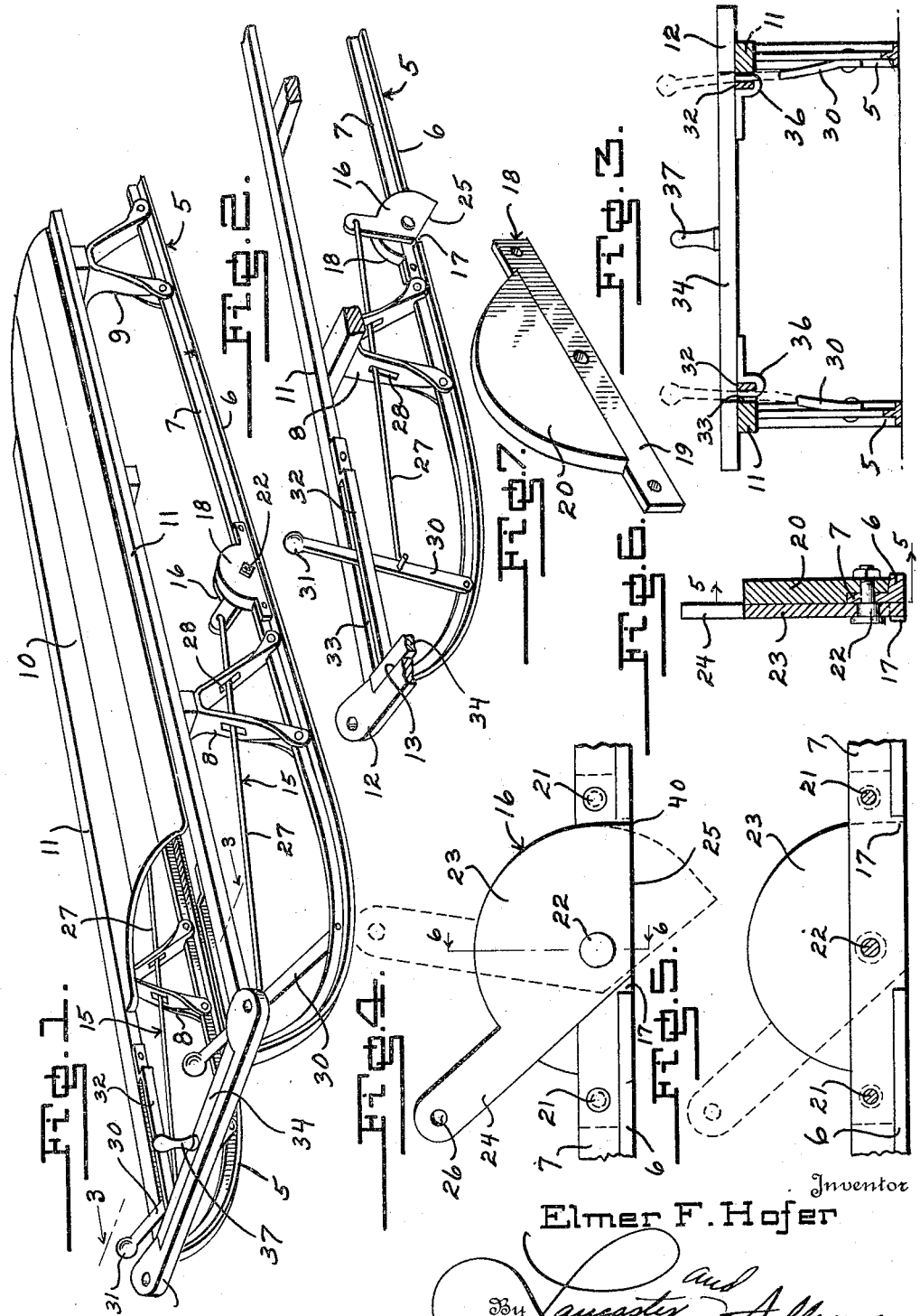
Inventor
Elmer F. Hofer
By Lancaster and Allwine
Attorneys Patented Jan. 13, 1931

1,788,717

UNITED STATES PATENT OFFICE

ELMER F. HOFER, OF ATCHISON, KANSAS

SLED

Application filed December 10, 1927. Serial No. 239,118.

The present invention relates to improvements in sleds, and the primary object of the invention is to provide an improved sled construction embodying means for checking travel of the sled and also serving as a steering device therefor.

A further object of the invention is to provide a sled embodying a combined steering and braking device which is so disposed as to be readily accessible to the occupant of the sled.

A further object of the invention is to provide an improved sled embodying drag members associated with opposite runners of the sled and operable independently of one another to serve as means for steering the sled, or operable together by one hand of the occupant to create a braking action on the sled.

A still further object of the invention resides in the provision of an improved brake and steering device embodying drag members operable thru the sled runners in such manner as to not retard travel of the sled until the drag members are operated by the occupant of the sled for performing a braking or steering function.

A still further object of the invention resides in the provision of a sled brake and steering device which may be readily applied to existing types of sleds constructed with T-shaped runners.

Other objects and advantages of the invention will be apparent during the course of the following detailed description, taken in connection with the accompanying drawing, forming a part of this specification, and in which drawing:

Figure 1 is a perspective view of a sled and showing the improved brake and steering device incorporated in the construction thereof.

Figure 2 is a fragmentary perspective sectional view looking at the inner side of one of the sled runners and showing the manner in which the drag element is brought into operation.

Figure 3 is a transverse section taken substantially on the line 3—3 of Figure 1, looking forwardly, and showing the manner in which the cross bar for simultaneous operation of the drag members is connected with the guide brackets.

Figure 4 is an enlarged fragmentary view illustrating the manner in which the drag members are pivotally connected with the sled runners, the view being one looking at the sled runner from its inner side.

Figure 5 is a section on line 5—5 of Figure 6 and looking in the direction of the arrows.

Figure 6 is a vertical section on line 6—6 of Figure 4.

Figure 7 is a perspective view of one of the combined guard and reinforcing plates for the drag members.

Referring to the drawing in detail, and wherein similar reference characters designate corresponding parts thruout the several views, the improved sled has been shown as embodying a pair of metallic runners 5 of T-shape in cross section providing a flat tread portion 6 and an upstanding flange or web 7 which extends upwardly midway between the longitudinal edges of the tread portion. Connected at their lower ends to the upstanding web 7 of each runner are front and rear standards 8 and 9 respectively, serving as a support for a suitable seat board 10. Extending along each side of the seat board 10 are longitudinal side rails 11 which project forwardly of the front end of the seat board and are attached in any suitable manner at their forward ends to the upturned forward ends of the runners 5. Connected across the forward ends of the side rails 11 is a transverse foot bar 12 which preferably has its ends extending to each side of the sled past the side rails. This foot bar 12 extends across the upper side of the side rails and is provided at its rear edge with a longitudinally formed pocket 13 which is preferably of a length equal to the distance between the inner or concentric faces of the longitudinal side rails.

A combined brake and steering device 15 is associated with each of the sled runners 5, and each device embodies a drag element or member 16 adapted to be associated with the runners at a location between the standards 8 and 9. Each of the tread portions 6 of the runners 5 is recessed longitudinally at the inner side of the web 7 as at 17, and these recesses 17 preferably align transversely of the sled. These recesses 17 are preferably provided in the tread portions 6 at a point substantially midway longitudinally of the tread surface of the runners. A combined guard and reinforcing member 18 is provided for reinforcing the runners weakened by the provision of the recesses 17, and serving as a guard for the drag members 16, and each embodies an attaching plate or strip 19 and a semi-circular shaped guard plate 20 which is preferably of greater thickness than that of the attaching strip 19. The attaching strips 19 are disposed longitudinal upon the outer side of the upstanding web 7 and may be secured thereto as by suitable rivets or the like 21 which extend thru the terminal portions of the strip and thru the web. The strip 19 is of a height equal to the height of the web 7 and is intended to span the recess 17, and by observing Figure 6 it will be seen that by so having the drag plate 20 of greater thickness than that of the strip 19, that the inner face of the guard plate will extend flush with the inner face of the web 7 when the combined guard and reinforcing members are attached to the runners.

The drag members 16, and one of which is pivotally mounted at the inner side of each of the members 18 as upon a pivot pin or bolt 22 extending thru the webb 7 and attaching strip 19 above the longitudinally formed recesses 17, each embodies a quadrant-shaped body portion 23 and an arm portion 24 which projects above the guard plate 20. By observing Figure 4 it will be seen that the substantially quadrant-shaped body portion 23 is pivotally mounted in the web 7 adjacent the forward end of the recess 17 and that when the lower straight edge 25 extends parallel with the lower surface of the tread portion 6, that the arm 24 extends forwardly and upwardly from the pivot 22.

Connected at their rear ends to the arms 24 of each of the drag members 16, as thru the apertures 26 provided in the ends of the arms, are operating rods or links 27 which extend thru longitudinal guide slots 28 formed vertically in the front standards 8. These rods or links 27 extend forwardly between the runners 5 and side rails 11 and have their forward ends connected to control levers 30 which are arranged inwardly of the side rails and are pivotally connected at their lower ends to the runner webs 7. The forward ends of the rods 27 may be connected to the levers 30 in any suitable manner so that upon forward and rearward movement of the levers the rods will be moved longitudinally for imparting movement to the drag members 16. These independently movable control levers 30 extend for a suitable distance above the side rails 11 and preferably have knobs 31 provided at their upper ends to form suitable hand grips to be grasped by the occupant of the sled when desiring to operate the combined brake and steering devices. A guide bracket 32 is secured longitudinally and to the inner side of each of the side rails 11 and form longitudinal guide slots 33 in which the upper portions of the control levers are movable in a direction longitudinally of the sled. Thus it will be seen that upon rearward swinging of either of the control levers 30 that their respective drag members will be brought into operation for creating a dragging action on their respective runners.

A means is also provided for simultaneous operation of the drag members 16, and this means embodies a cross bar 34 fitting in the pocket 13 provided in the rear edge of the foot bar 12 with its terminal portions resting upon the upper edge of the guide brackets which project beneath the foot bar. Since the guide slots 33 are provided at the inner sides of the longitudinal side rails 11 it will be seen that the terminal portions of the cross bar overlie the forward ends of the guide slots and in the path of movement of the control levers 30. Carried by the under side of the cross bar 34 adjacent each end thereof, are guide clips 36 which extend beneath the guide brackets 32 and have terminal portions which project upwardly into the guide slots 33 in a manner whereby the cross bar is held against displacement and yet permitted to have movement rearwardly in the guide brackets. A suitable handle 37 preferably may project upwardly from the medial portion of the cross bar to be grasped by the occupant of the sled when desiring to operate both of the drag members at one time. Since the control levers 30 when in their forward inoperative position engage the rear edge of the cross bar 34 it will be seen that when the cross bar is moved rearwardly on the guide brackets 32 that both of the control levers will be swung rearwardly in the guide slots 33.

When either of the operating rods or links 27 are moved rearwardly for rocking the drag members 16 about their pivots 22 it will be seen that the rear end of the straight edge 25 will move to a position beneath the under surface of the tread portion 6 so that the pointed end 40 will bite into the snow or ice and thus create a drag on the runner to which the drag member is applied. When the drag members are moved to a position as shown by the dotted lines in Figure 4 it will be seen that the point 40 will create a drag sufficient to bring the sled to a stop in a relatively short space.

In using the sled, and when desiring to steer the sled, the occupant merely grasps the knob 31 and pulls backwardly on the desired control lever 30 for forming a drag on one or the other of the runners in accordance with the direction in which it is desired to steer the sled. The sharpness with which the turn is made will depend on the distance that the drag member is lowered beneath the tread portion of the runner, since it will be seen that a greater dragging action is created in accordance with the distance that the point is moved beneath the runners. When desiring to stop the sled, the occupant may either grasp each of the levers 30 and pull the same rearwardly, or grasp the handle 37 and pull the cross bar 34 rearwardly, and which rearward movement of the cross bar will swing both of the control levers rearwardly for operating their respective drag members.

By so having the drag members 16 operate thru the sled runners it will be seen that the same are disposed in a protected location and will not impede travel of the sled thru deep snow since the drag members together with the combined guard and reinforcing members are disposed between the planes of the longitudinal edges of the tread portions of the runners. Owing to the manner in which the drag members 16 are pivotally connected to the runners it will be seen that the arms 24 are held in a forward position during travel of the sled, and thus the control levers 30 are held in a forward position without requiring springs for returning the combined brake and steering devices to a running position.

It will also be observed that the combined brake and steering devices 15 may be readily applied to existing types of sleds by securing the guide brackets 32 to the usual side rails of the sled and attaching the control levers and members 16 and 18 to the sled runners.

From the foregoing description it will be seen that a novel type of sled has been provided embodying means whereby the sled may be guided, and which means may also be employed as a brake for stopping travel of the sled.

Changes in detail may be made to the form of the invention herein shown and described, without departing from the spirit of the invention or the scope of the following claims.

I claim:

1. A sled comprising a pair of runners, a seat supported above the runners including a seat board and side rails, extending forwardly of the seat board, a foot board connecting the forward ends of the side rails, a cross bar slidably mounted at its ends in the forward portions of the side rails, a combined brake and steering device for each sled runner, each embodying an independently movable control lever for selectively creating a drag on either of the sled runners, and a handle connected to the cross bar whereby the control levers may be simultaneously operated thru movement of the cross bar longitudinally along the side rails.

2. In a sled, a pair of runners, a side rail supported longitudinally above each runner and each having a guide slot provided adjacent its forward end, a combined brake and steering device for each sled runner, each embodying an independently movable control lever movable in said guide slot, and means for simultaneously imparting movement to the control levers embodying a cross bar engageable with the control levers and movable along the guide slots in the side rails.

3. In a sled, a pair of runners, a side rail supported longitudinally above each runner and each having a guide slot provided adjacent its forward end, a combined brake and steering device for each sled runner, each embodying a control lever pivotally connected at its lower end to one of the runners and projecting upwardly thru the guide slot of its overlying side rail, a cross bar extending transversely of the sled forwardly of the control levers and having its end portions slidably movable in the guide slots, and a handle connected with the cross bar for moving the bar rearwardly for simultaneously swinging both of the control levers.

4. In a sled, a pair of runners, a side rail supported longitudinally above each runner, guide brackets supported at the inner sides and at the forward portion of each side rail and each providing a guide slot extending longitudinally of the side rails, a foot bar connecting the forward ends of the side rails and having a pocket formed in its rear edge extending across the guide slots, a combined brake and steering device for each sled runner, each embodying an independently movable control lever pivotally connected at its lower end to one of the runners and extending upwardly thru said guide slots and a drag member for each control lever, a cross bar fitting in the pocket at the rear edge of the foot bar and having its end portions overlying the guide brackets forwardly of the control levers, and guide clips connecting the cross bar to the guide brackets whereby the cross bar may be moved rearwardly from the foot bar for simultaneous operation of the control levers.

5. The combination with a sled having a pair of runners provided with a tread portion and an upstanding web, said tread portions having an opening one side of which aligns with one face of the web, of a drag member pivotally mounted upon the web portion of each runner adjacent the forward ends of the openings in the tread portion and each having a straight edge normally aligning with the tread surface of the runners, and means for rocking the drag members about their pivotal connections for disposing rear portions of the drag members beneath the tread surfaces of the runners.

6. The combination with a sled having a pair of runners of T-shape in cross section providing a tread portion and an upstanding web, each of said tread portions having a recess at its inner edge, of a combined guard and reinforcing member for each runner including a plate for attachment to the web of the runners across the recesses and a segmental shaped guard plate projecting above the web, a drag member for each runner including a quadrant-shaped body portion pivotally connected to the web of the runners at each guard member and an upstanding arm portion, said quadrant-shaped body portions providing straight lower edges for normally aligning with the tread surfaces of the runners when the arm portions are inclined forwardly, a control lever pivotally connected at its lower end to each runner forwardly of the drag members, and a link connecting each control lever with the arm portion of its respective drag member.

ELMER F. HOFER.